3,309,216
ORIENTED POLYOXYMETHYLENE COATED WITH ORIENTED POLYETHYLENE CRYSTALS

Jakob Willems, Krefeld, Germany, assignor to Farbenfabriken Bayer Aktiengesellschaft, Leverkusen, Germany, a corporation of Germany
No Drawing. Filed Oct. 1, 1963, Ser. No. 312,885
Claims priority, application Germany, Oct. 16, 1962, W 33,133/64
3 Claims. (Cl. 117—7)

The present invention relates to oriented overgrowths between macromolecular compounds.

Oriented overgrowth between macromolecular compounds and low molecular weight compounds is known, for example the oriented overgrowth (epitaxy) of pentachlorophenol on oriented polyethylene and polyamide and the oriented overgrowth of the last mentioned macromolecular substances on rock salt. In these cases the macromolecular substance occurs either as the guest lattic (deposit) or as the host lattice (substrate). One of the components of the overgrowth, namely the low molecular weight component, is completely crystallized while the macromolecular component is only partly crystalized, the degree of crystallinity depending on the nature of the macromolecular substance.

It has now been found that two different high molecular weight substances, i.e. two substances which are only partly crystallized, can form oriented intergrowths.

The overgrowth may be obtained in known manner, for example by the application of a solution of the guest substances in suitable, preferably non polar solvents, on the oriented substrate. By varying the conditions of the experiment, particularly by varying the quantity of deposit applied to the substrate, the size of the deposit crystals may be varied from the sub-microscopic range up to non-porous layers of the deposit crystals. By alternate application of deposit crystals and substrate crystals, "layer crystals" and "anomalous mixed crystals" may be obtained by this method.

As example there may be mentioned the overgrowth which can readily be obtained by the application of a soution of polyethylene in p-xylene on oriented polyoxymethylene.

The properties of the macromolecular substances are modified in a technically advantageous manner when the substances are in the form of an oriented overgrowth. Thus, for example, the surface of the substrate may be improved by the application of an oriented overgrown deposit.

The macromolocular substances formed by oriented overgrowth may advantageously be used in many different fields of application of synthetic linear polymers. Thus, the oriented overgrowth is useful for modifying the surface properties, such as hardness, solubility, light stability, resistance to chemicals etc. of shaped articles, such as films, foils, filaments or fibers consisting of oriented or partially oriented synthetic linear polymers.

Example 1

Granules of polyoxymethylene obtainable commercially under the trade name "Delrin" are moulded into thin, round discs. Suitable low molecular weight substances grow in an oriented manner on the surface of these discs; thus, for example, pentachlorophenol sublimed on to these discs separates out in needle shaped crystals having the longitudinal axis of the needles parallel to the radius of the discs.

An approximately 0.2% solution in p-xylene of polyethylene obtainable commercially under the trade name "Marlex" (M.=105,000) is applied on to the surface of the discs heated to 120° C. The polyethylene crystallizes out in the form of needles or as fibriliform crystallites which are frequently curved, the longitudinal axes of the needles all taking up one position, namely perpendicular to the radius of the disc-shaped particles, i.e. in the tangential direction.

Example 2

The solution of polyethylene described in Example 1 is applied to a surface, heated to 120° C., of a foil of polyoxymethylene which has been stretched unilaterally over a hot edge at about 165° C. The crystallites of polyethylene separating out from this solution all arrange themselves in one direction, namely with the longitudinal axes of the needles perpendicular to the dirction in which the foils were stretched.

A stretched thread, for example one used for textile purposes, may be used instead of the foil as the substrate for the overgrowth.

I claim:

1. Oriented polyoxymethylene coated with polyethylene crystals, the longitudinal axes of said crystals being arranged perpendicular to the direction of orientation of said polyoxymethylene.

2. A unilaterally stretched film of polyoxymethylene coated with polyethylene crystals, the longitudinal axes of said crystals being arranged perpendicular to the direction of unilateral stretching of said polyoxymethylene.

3. A stretched textile thread of polyoxymethylene coated with polyethylene crystals, the longitudinal axes of said crystals being arranged perpendicular to the longitudinal axis of said textile thread.

References Cited by the Examiner

UNITED STATES PATENTS

| | | | |
|---|---|---|---|
| 2,397,149 | 3/1946 | Land | 117—138.8 X |
| 2,445,555 | 7/1948 | Binda | 117—138.8 X |
| 2,445,579 | 7/1948 | Hyman et al. | 117—138.8 X |
| 2,627,088 | 2/1953 | Alles et al. | 117—138.8 X |
| 2,698,239 | 12/1954 | Alles et al. | 117—138.8 X |
| 2,861,897 | 11/1958 | Hendrixson | 117—47 |
| 2,930,718 | 3/1960 | Abbott | 117—47 X |
| 2,971,858 | 2/1961 | Di Giulio | 117—47 X |
| 2,972,553 | 2/1961 | Hess | 117—47 |
| 3,124,476 | 3/1964 | Park et al. | 117—47 |

WILLIAM D. MARTIN, *Primary Examiner.*

R. HUSACK, *Assistant Examiner.*